(12) United States Patent
Rosenman et al.

(10) Patent No.: US 7,151,257 B2
(45) Date of Patent: Dec. 19, 2006

(54) TAILORING DOMAIN ENGINEERED STRUCTURES IN FERROELECTRIC MATERIALS

(75) Inventors: Gil Rosenman, Rishon-Lezion (IL); Yossi Rosenwaks, Hod-Hasharon (IL); Ronen-Pavel Urenski, Bat-Yam (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 27 days.

(21) Appl. No.: 10/859,046

(22) Filed: Jun. 1, 2004

(65) Prior Publication Data

US 2005/0023462 A1 Feb. 3, 2005

Related U.S. Application Data

(63) Continuation of application No. PCT/IL02/00961, filed on Nov. 28, 2002, which is a continuation-in-part of application No. 09/997,812, filed on Nov. 30, 2001, now Pat. No. 6,653,630.

(51) Int. Cl.
*G21K 7/00* (2006.01)
(52) U.S. Cl. .................. 250/306; 250/307; 359/326; 359/328; 365/65
(58) Field of Classification Search ............... 205/306
See application file for complete search history.

(56) References Cited

U.S. PATENT DOCUMENTS

| 5,481,527 A | 1/1996 | Kasanuki et al. |
| 6,000,281 A * | 12/1999 | Burke ........................ 73/105 |
| 6,064,587 A | 5/2000 | William |
| 6,211,999 B1 | 4/2001 | Gopalan et al. |
| 6,249,503 B1 | 6/2001 | Aratani |

OTHER PUBLICATIONS

Auciello, O. et al.; "Nanoscale Scanning Force Imaging of Polarization Phenomena in Ferroelectric Thin Films"; Published in the Annual Review of Material Sciences 28, pp. 33-42; Jan. 1998.
Bierlein, J. D. et al.; "Balanced Phase Matching in Segmented KtiOPO$_4$ Waveguides"; Applied Physics Letters, vol. 56, No. 18; pp. 1725-1727; Apr. 30, 1990.
Binning, G. et al.; "Atomic Force Microscope"; Physical Review Letters, vol. 56, No. 9; pp. 930-933; Mar. 3, 1986.
Eng, L. M. et al.; "Ferroelectric Domain Switching in Tri-Glycine Sulphate and Barium-Titanate Bulk Single Crystals by Scanning Force Microscopy"; Applied Physics A 66, pp. S679-S683, 1998.
Eng, L. M.; "Nanoscale Domain Engineering and Characterization of Ferroelectric Domains"; Nanotechnology 10, Printed in U.K.; pp. 405-411; 1999.

(Continued)

*Primary Examiner*—Drew A. Dunn
*Assistant Examiner*—James J. Leybourne
(74) *Attorney, Agent, or Firm*—Fenster & Company

(57) ABSTRACT

Scanning probe apparatus, comprising:
a) a tip-electrode which is coupled to be maintained at a first potential;
b) a counter-electrode which is positioned in proximity with the tip electrode and which is coupled to be maintained at a second potential differing from the first potential by a value greater than approximately 150 volts; and
c) positioning instrumentation, which is adapted to maintain the tip-electrode at a distance from a surface while scanning the tip-electrode parallel to the surface, and controls the position of the tip-electrode in a scanning direction parallel to the surface to within a resolution sufficient so that the apparatus can be used as a scanning probe microscope.

10 Claims, 9 Drawing Sheets

OTHER PUBLICATIONS

Fatuzzo et al.; "Ferroelectricity—Chapter 7: Dynamic Properties of Ferroelectrics Experiments"; Published by North-Holland Publishing Company—Amsterdam, pp. 197-234; 1967.

Feng, D. et al.; "Enhancement of Second-Harmonic Generation in LiNbO3 Crystals with Periodic Laminar Ferroelectric Domains"; Applied Physics Letters, vol. 37, No. 7; pp. 607-609; Oct. 1, 1980.

Keys, R. W. et al.; "Fabrication of Domain Reversed Grating for SHG in $LiNbO_3$ by Electron Beam Bombardment"; Electronics Letters, vol. 26, No. 3; pp. 188-190; Feb. 1, 1990.

Kitamura, K. et al.; "Nonstoichemistry Control of $LiTaO_3$ for Ferroelectric Domain Engineered Devices"; International Workshop on Periodically Microstructured Nonlinear Optical Materials, El Escorial, Madrid; p. 1; Jun. 10-13, 2001.

Lines et al.; Principles of Ferroelectric and Related Materials—Chapter 4: "Domains, Imperfections, and Polarization Reversal"; Published by The Clarendon Press, Oxford; pp. 87-126; 1977.

Lutwyche, M. I. et al.; "Highly Parallel Data Storage System Based on Scanning Probe Arrays"; Applied Physics Letters, vol. 77, No. 20; pp. 3299-3301; Nov. 13, 2000.

Marre, D. et al.; "Nanoscopic Control of the Polarization in Single Crystalline Ferroelectric Films"; Published in Nanosciences, NRPNR 36; University of Geneva; pp. 84-85.

Gopalan, V. et al.; "Switching Kinetics of 180° Domains in Congruent $LiNbO_3$ and $LiTaO_3$ Crystals"; Solid State Communications, 109; pp. 111-117; 1999.

Rosenman, G. et al.; "Ferroelectric Domain Engineering for Quasi-Phase-Matched Nonlinear Optical Devices"; Ferroelectrics Review, vol. 1; pp. 263-326; Overseas Publishers Association by license under Gordon and Breach Publishers; 1999.

Safari, A. et al.; "Ferroelectric Ceramics: Processing, Properties & Applications"; Published online at http://www.rci.rutgers.edu/~ecerg/projects/ferroelectric.html on Aug. 28, 2000; 59 pages.

Wickramshinghe, K. H.; "Scanned-Probe Microscopes"; Scientific American, vol. 260, No. 10; pp. 98-105; Oct. 1989.

* cited by examiner

TAILORING DOMAIN ENGINEERED STRUCTURES IN FERROELECTRIC MATERIALS

RELATED APPLICATIONS

The present application is a continuation of PCT Application No. PCT/IL02/00961 filed on Nov. 28, 2002 published as WO 03/046926 which is a continuation-in-part of U.S. application Ser. No. 09/997,812 filed on Nov. 30, 2001 now U.S. Pat. No. 6,653,630.

FIELD OF THE INVENTION

The present invention relates generally to ferroelectric materials, and specifically to a system for producing structured domains in the materials.

BACKGROUND OF THE INVENTION

FIG. 1 is a schematic diagram of two types of collinear ferroelectric, as are known in the art. A ferroelectric is a material which, by virtue of the material's underlying crystal structure, is able to maintain an electric polarization, or dipole moment, in the absence of an electric field. The ferroelectric may be in the form of a mono-domain 20, wherein the ferroelectric has one polarization direction, or a multi-domain 22, wherein the crystal has many domain regions, each domain having a different direction of polarization. Mono-domain ferroelectrics are well known as materials exhibiting useful properties such as piezoelectricity and electro-optical qualities. While irregular multi-domain ferroelectrics are not considered as particularly useful, multi-domain ferroelectrics where the multi-domains have a definite structure, termed domain engineered structures (DESs), have been found to have extremely useful properties.

The polarization of a single domain in collinear ferroelectrics may be in one of two directions, at 180° to each other. When a single domain is formed, the polarization of the domain will form spontaneously in one of the directions. The initial direction may be influenced during formation of the domain, for instance in a process termed poling wherein an electric field is applied as the ferroelectric material forms. Once formed, the polarization of the domain may be altered by further poling applications of the electric field. Typically, in the absence of an electric field, a multi-domain ferroelectric forms with the domains randomly oriented, giving an overall polarization close to or equal to zero, since this is the most stable energy state of the multi-domain.

FIG. 2 is a hysteresis curve for a multi-domain ferroelectric, plotting polarization P vs. electric field E, as is known in the art. As the electric field strength is increased, the domains of the ferroelectric start to align in a positive direction giving rise to a rapid increase in the overall polarization (OB). At very high field levels, the polarization reaches a saturation value ($P_{sat}$), where all the multi-domains are substantially aligned in the positive direction. As the external field is reduced, the polarization reduces as some of the domains change alignment, but the polarization does not fall to zero when the external field is removed.

At zero external field, the domains remain aligned in the positive direction, hence the ferroelectric will show a remanent polarization $P_r$. The ferroelectric cannot be completely depolarized until a field of magnitude OF is applied in the negative direction. The external field needed to reduce the polarization to zero is termed the coercive field strength $E_c$.

If the field is increased to a more negative value, the direction of polarization reverses, and if the field is increased sufficiently in the negative direction, the ferroelectric again reaches saturation. The value of the spontaneous polarization $P_s$ (OS) is obtained by extrapolating the saturation curve onto the polarization axes. $P_s$ is the polarization that the multi-domain ferroelectric would have, in the absence of an external field, if all the domains were aligned.

FIG. 3 is a schematic diagram of domain engineered structures and graphs of their properties, as are known in the art. DES 24 comprises two head-to-head domains formed in a rectangular plate of $LiNbO_3$ with dimensions (x, y, z). A graph 26 shows the acoustic impedance vs. frequency for acoustic vibrations of DES 24. A graph 28 gives the impedance response for acoustic vibrations of a mono-domain crystal 25 of $LiNbO_3$ having the same dimensions as DES 24, showing resonances dependent on the values of x, y and z. It is seen that these resonances are absent in DES 24. Conversely, two "bending" resonances are present in DES 24 which are not present in the mono-domain crystal.

DES 30 has a linear periodic structure where alternating domains have opposite polarizations. Structures such as DES 30 allow, for example, second harmonic generation and optical parametric oscillation for electromagnetic waves incident on the structure, because of the non-linear properties of the alternating domains of the DES. More detailed descriptions of properties and methods of production of structures such as DES 24 and DES 30 are given in an article entitled "Ferroelectric Domain Engineering for Quasi-Phase-Matched Nonlinear Optical Devices" by Rosenman, Skliar, and Arie, published in *Ferroelectrics* 1, N4, pp 1–64 (1998), which is incorporated herein by reference. Methods detailed therein, and others known in the art for producing domain engineered structures, are summarized below.

Domain engineered structures may be formed by altering the doping of a crystal during its growth. In an article entitled "Enhancement of second-harmonic generation in $LiNbO_3$ crystals with periodic laminar ferroelectric domains" by Feng et al., published in *Applied Physics Letters* 37, pg 607 (1980), which is incorporated herein by reference, the authors describe a method for varying the spontaneous polarization of growing $LiNbO_3$ crystals by changing the doping of the crystals. The doping was changed by periodically altering the temperature of the growing crystal, which in turn altered the concentration of yttrium which was used to dope the crystals. The variation in yttrium concentration caused a periodic reversal of the polarization of the crystals, the reversal appearing through the bulk of the crystals.

Diffusion at relatively high temperatures can be used to form DESs. For example, in an article entitled "Balanced phase matching in segmented $KTiOPO_4$ waveguides" by Bierlein et al., published in *Applied Physics Letters* 56, pg 1725 (1990), which is incorporated herein by reference, the authors describe polarization in $KTiOPO_4$ (KTP) crystals. By immersing the KTP crystals in molten $RbNO_3/Ba(NO_3)_2$, at a temperature of about 350° C. for approximately 1 hour, $Rb^+$ ions exchanged with $K^+$ ions of the KTP. The presence of the $Ba^{2+}$ ions caused polarization inversion of domains at the surface of the KTP. It will be appreciated that diffusion induced DESs are substantially surface structures.

Electron beam writing may be used to form DESs. For example, in an article entitled "Fabrication of Domain Reversed Gratings FOR SHG in $LiNbO_3$ by Electron Beam Bombardment" by Keys et al., published in *Electronics Letters* 26, pg 188 (1990), which is incorporated herein by reference, the authors describe domain polarization reversal on the negative face of a LiNbO$_3$ crystal. It will be appreciated since the electron beams penetrate no more than some microns in depth, DESs produced by electron beam writing must be of this order of thickness.

FIG. 4 is a schematic diagram of a poling system for fabrication of DESs, as is known in the art. A mono-domain ferroelectric 40 has a periodic dielectric photo-resist 42 applied to an upper surface of the ferroelectric. A first conductor 44 is overlaid on photo-resist 42 and the upper surface, and a second conductor 46 is applied to a lower surface of the ferroelectric. A high-voltage pulse is applied between the two electrodes. The pulse reverses the polarization of the ferroelectric in regions where the first conductor contacts the ferroelectric. This technique, and similar ones using liquid electrodes, have been used to form periodic DESs having thicknesses in a range of 0.5–3 mm, and with periods between 3.4 and 39 microns.

Scanning force microscopy (SFM) is a method known in the art for imaging surfaces, and also for modification of domain structures of thin films of ferroelectrics. A review of SFM is provided in an article entitled "Nanoscale Scanning Force Imaging of Polarization Phenomenon in Ferroelectric Thin Films" by Auciello et al., published in The Annual Review of Material Sciences 28, pgs 33–41 (1998), which is incorporated herein by reference. The review includes a description of contact and non-contact SFM. In both types of SFM, a tip-electrode is scanned across the surface of a sample to be imaged, and forces exerted on the tip by the sample enable ferroelectric domains within the sample to be imaged.

FIG. 5 is a schematic diagram of a scanning force microscope (SFM) 50, as described in an article entitled "Ferroelectric domain switching in tri-glycine sulphate and barium-titanate bulk crystals by scanning force microscopy" by Eng et al., published in *Applied Physics A* 66, S679–S683 (1998), which is incorporated herein by reference. In the article the authors describe how microscope 50 may be used to form DESs. A tip-electrode 52, supported by a cantilever 62, is scanned relative to an upper surface 54 of a ferroelectric sample 56. Tip-electrode 52 ends in an extremely sharp point, so that very high electric fields are generated at the tip. The height of tip-electrode 52 above the surface is maintained at a substantially fixed distance, of the order of nanometers, by circuitry 58. Circuitry 58 comprises a function generator 64 which provides an alternating potential U$_1$ of amplitude 10 V and frequency 20 kHz that is applied to the tip-electrode, causing cantilever 62 to oscillate vertically. The vertical oscillations of the cantilever are detected by a 2-quadrant photo-detector 51, which receives a laser beam after reflection from the cantilever. An output of the photo-detector is input to an amplifier 53, which outputs a negative feedback signal to a z-positioner 55.

Sample 54 is supported on a counter-electrode 60, which may be set to a potential U$_2$ of 60 V for a certain exposure time τ, enabling domain-forming electric field pulses to be applied to sample 56. Using this technique, DESs having a lifetime of more than 5 days were formed in 125 micron thick BaTiO$_3$. However, in 700 micron thick tri-glycine sulphate (TGS), the domains had a lifetime of only 30 minutes.

In chapter 4 of *Principles and Applications of Ferroelectric and Related Materials*, by Lines et al., published by The Clarendon Press, Oxford (1977), which is incorporated herein by reference, the authors describe a three-stage process for the production of a ferroelectric domain in a ferroelectric material which is already spontaneously polarized. This process also leads to the formation of domains in the scanning process of SFM 50. In a first stage, a nucleus of a primary domain is formed by an applied field opposite in direction to the spontaneous polarization. A local value of the applied field must be larger than a coercive field of the material. In a second stage, the nucleus grows in a forward and sideways direction. In a third stage, secondary domain nuclei generate at the domain wall of the primary nucleus.

An important consideration in domain reversal phenomenon is domain configuration stability. In an article entitled "Switching kinetics of 180° domains in congruent LiNbO$_3$ and LiTaO$_3$ crystals" by Gopalan et al., published in *Solid State Communications*, 109, 111 (1999) which is incorporated herein by reference, the authors describe how the stabilization process may be related to pinning of the domain wall by randomly distributed defects of different origin. A corresponding characteristic time for the stabilization process is determined by the time needed for the equilibrium distribution of local pinning (defect) centers around the domain walls. (A similar process occurs with Cottrell clouds.) Thus, in order to stabilize the reversed domains, the applied voltage pulse duration should be longer than the stabilization process occurring in the domain pinning process.

A switching time $\tau_{sw}$ for complete reversal of the initial spontaneous polarization is thus given by $$\tau_{sw} = \tau_{nucl} + \tau_{forw} + \tau_{stab} \quad (1)$$

wherein $\tau_{nucl}$ is a time for the primary domain nucleus to be formed, $\tau_{forw}$ is a time for the forward/sideways growth to occur, and $\tau_{stab}$ is a stabilization time needed for full pinning of a reversed domain.

The authors of *Principles and Applications of Ferroelectric and Related Materials* describe a method using pulsed polarization reversal for evaluating $\tau_{sw}$. (The method is described in more detail in chapter 7 of *Ferroelectricity* by Fatuzzo and Merz, published by North-Holland Publishing Company (1967), which is incorporated herein by reference.) The method may also be used to produce a DES, and it is stated that for complete polarization reversal, a duration $\tau_{dur}$ of a DC pulse generating the DES must satisfy the following equation:

$$\tau_{dur} > \tau_{sw} \quad (2)$$

Providing that equation (2) is satisfied, no back-switching effect or instability is present in the formed DES.

Hereinbelow the terms zero-dimensional, one-dimensional, and two-dimensional are used in referring to a DES. It will be understood that the terms refer to respective cross-sections of the DES, so that a zero-dimensional DES comprises generally rod-like structures, a one-dimensional DES comprises generally plate-like structures, and a two-dimensional DES comprises generally prism-like structures.

SUMMARY OF THE INVENTION

It is an object of some aspects of the present invention to provide apparatus and a method for generating stable domain-engineered structures (DESs) in thick ferroelectric materials.

In a preferred embodiment of the present invention, a scanning probe apparatus, preferably implemented from a scanning force microscope (SFM), comprises a grounded tip-electrode, supported by a cantilever, and a counter-electrode which is coupled to operate at potentials of the order of tens of kilovolts. By grounding the tip-electrode, any instrumentation coupled to the cantilever, which in prior art scanning probe apparatus would be adversely affected if a high voltage were applied to the tip-electrode, is protected from adverse effects. By applying a high potential to the counter-electrode, high electric fields can be applied to a ferroelectric sample positioned between the electrodes. Since the electrodes of the apparatus are able to support potential differences between themselves of the order of kilovolts, the electrodes may be separated by distances of the order of millimeters and still produce average fields of the order of kV/cm. Fields of these strengths are sufficient to form stable DESs in the ferroelectric sample, including bulk samples having thicknesses of the order of several millimeters. By contrast, scanning probe apparatus known in the art, with non-grounded tip electrodes, are capable of forming DESs only in thin layers, with poor stability over time.

In an alternative preferred embodiment of the present invention, the tip-electrode is not grounded. The tip-electrode and any instrumentation coupled to the cantilever are insulated from the ground so that high voltage applied to the tip-electrode does not cause adverse effects. The counter-electrode is preferably grounded. Alternatively, the counter-electrode is insulated from the ground. As described above, high electric fields can be applied to a ferroelectric sample positioned between the electrodes by applying appropriate potentials to the tip-electrode (when the counter-electrode is grounded) or to both electrodes.

The cantilever holds the tip-electrode so that it touches, or is held at a short distance above—typically less than a nanometer—an upper surface of the ferroelectric sample. To form DESs in the sample, the tip-electrode and the ferroelectric sample are scanned relative to each other at a substantially fixed velocity. Preferably, in order to perform the scanning, a piezoelectric positioner is coupled to the counter-electrode, and is used to pre-position and scan the ferroelectric sample in one or two horizontal dimensions relative to the tip-electrode. Alternatively or additionally, the scanning is performed by one and/or two dimensional scanning instrumentation coupled to the cantilever. The high voltage applied between the electrodes may be applied as a substantially steady DC voltage or as a pulsed DC voltage. Thus, DESs of virtually any design may be constructed in the bulk ferroelectric, including zero-dimensional, one-dimensional, and two-dimensional patterns.

In some preferred embodiments of the present invention, the scanning is performed within a range of pre-determined "domain-writing" velocities. Operating within this range, domains which are stable over time, and which are well-defined dimensionally so that there is substantially no broadening or narrowing of the domains, are developed within the bulk ferroelectric material by a substantially continuous writing process.

The tip-electrode preferably terminates at one extremely sharp point. Alternatively, in some preferred embodiments of the present invention, multi-tip electrodes, comprising two or more substantially similar point tips, are used in place of the single tip-electrode, so that multiple DESs can be written in parallel. In other preferred embodiments of the present invention, one- or two-dimensional tip-electrodes are used, enabling DESs to be formed in the bulk ferroelectric sample by a process similar to "branding" or "stamping" of the sample.

In some preferred embodiments of the present invention, the scanning probe apparatus is convertible to an SFM, the SFM being able to read DESs formed by the apparatus.

In some preferred embodiments of the present invention, a DES is thermally processed after its initial formation. The thermal processing allows for dimensions of domains in the DES to be altered in a controlled manner.

There is therefore provided, according to a preferred embodiment of the present invention, scanning probe apparatus, including:

a tip-electrode which is coupled to be held at a substantially ground potential;

a counter-electrode which is positioned in proximity to the tip-electrode;

a voltage source, coupled to maintain the counter-electrode at a non-ground potential; and positioning-instrumentation, which is adapted to maintain the tip-electrode at a suitable position relative to a surface of a ferroelectric sample located in a space between the tip-electrode and the counter-electrode so as to generate an electric field in the ferroelectric sample greater than a coercive field thereof.

Preferably, the apparatus includes scanning-instrumentation which is adapted to induce the tip-electrode and the ferroelectric sample to move relative to each other, so that the tip-electrode scans across the surface of the sample.

Further preferably, the scanning-instrumentation is adapted to induce relative motion between the tip-electrode and the ferroelectric sample at a suitable velocity to produce a stable domain-engineered structure (DES) having a substantially invariant cross-section throughout the ferroelectric sample.

Preferably, the DES includes a one-dimensional DES.

Alternatively, the DES includes a two-dimensional DES.

Preferably, the suitable velocity includes a critical relative velocity having a magnitude $V_{crit}$ approximately equal to $$\frac{R}{\tau_{sw}},$$

wherein R is a size of a stable domain produced by the electric field and $\tau_{sw}$ is a switching time for reversal of a polarization of the ferroelectric sample.

Preferably, the voltage source is adapted to maintain the non-ground potential at a value $U_{Rmin}$ approximately equal to or greater than a product of the coercive field and a thickness of the ferroelectric sample.

Further preferably, the voltage source is adapted to pulse the non-ground potential for a pre-determined period $\tau_{dur}$ so as to produce a stable DES having a substantially invariant cross-section throughout the ferroelectric sample.

Preferably, the DES includes a zero-dimensional DES.

Alternatively, the DES includes a one-dimensional DES.

Further alternatively, the DES includes a two-dimensional DES.

Preferably, the pre-determined period $\tau_{dur}$ is greater than a switching time $\tau_{sw}$ for reversal of a polarization of the ferroelectric sample and is less than a dielectric relaxation time $\tau_{rel}$ of the ferroelectric sample.

Preferably, the apparatus includes an insulating holder which is adapted to hold the ferroelectric sample and to electrically insulate the counter-electrode.

Further preferably, the insulating holder includes a heater which is adapted to maintain a temperature of the ferroelectric sample above an ambient temperature of the apparatus.

Alternatively or additionally, the insulating holder includes a cooler which is adapted to maintain a temperature of the ferroelectric sample below an ambient temperature of the apparatus.

Preferably, the tip-electrode terminates in two or more separate sharp points, and the electric field includes substantially similar respective electric fields generated by each point.

Alternatively, the tip-electrode terminates in a multi-dimensional surface.

Further alternatively, the tip-electrode terminates in a single sharp point.

Preferably, the voltage source is adapted to generate a sufficient potential so as to form one or more stable domains in the ferroelectric sample.

Preferably, the one or more stable domains include a zero-dimensional DES having a substantially invariant cross-section throughout the sample.

Further preferably, the one or more stable domains include a one-dimensional DES having a substantially invariant cross-section throughout the sample.

Alternatively or additionally, the one or more stable domains include a two-dimensional DES having a substantially invariant cross-section throughout the sample.

Preferably, the ferroelectric sample includes an optical element.

Preferably, the one or more stable domains include a periodic DES.

Alternatively, the one or more stable domains include an a periodic DES.

Preferably, the ferroelectric sample includes an existing DES, and the voltage source is adapted to apply a potential so as to erase at least a part of the existing DES.

Preferably, the positioning-instrumentation is adapted to maintain the position of the tip-electrode to be substantially in contact with the surface of the ferroelectric sample.

Preferably, the tip-electrode, the counter-electrode, the voltage source, and the positioning-instrumentation are adapted to be operative as a scanning force microscope which reads the ferroelectric sample.

Preferably, the apparatus includes a thermal conditioning element which is adapted to thermally process the ferroelectric sample after generation of the electric field therein so as to alter a dimension of a domain-engineered structure in the ferroelectric sample and to stabilize the dimension.

There is further provided, according to a preferred embodiment of the present invention, scanning probe apparatus, including:

a tip-electrode which is coupled to be maintained at a first potential;

a counter-electrode which is positioned in proximity to the tip-electrode and which is coupled to be maintained at a second potential differing from the first potential; and scanning-instrumentation, which is adapted to induce relative motion between the tip-electrode and a ferroelectric sample located in a space between the tip-electrode and the counter-electrode at a suitable velocity to produce a stable domain-engineered structure (DES) having a substantially invariant cross-section throughout the ferroelectric sample.

Preferably, the suitable velocity includes a critical relative velocity having a magnitude $V_{crit}$ approximately equal to $$\frac{R}{\tau_{sw}},$$

wherein R is a size of a stable domain produced by an electric field generated in the ferroelectric sample by the first and second potential and $\tau_{sw}$ is a switching time for reversal of a polarization of the ferroelectric sample.

Preferably, an electric field generated in the ferroelectric sample by the first and second potential is greater than a coercive field thereof.

There is further provided, according to a preferred embodiment of the present invention, scanning probe apparatus, including:

a tip-electrode which is coupled to be maintained at a first potential;

a counter-electrode which is positioned in proximity to the tip-electrode and which is coupled to be maintained at a second potential differing from the first potential by a value greater than approximately 150 V; and positioning-instrumentation, which is adapted to maintain the tip-electrode at a suitable position relative to a surface of a ferroelectric sample located in a space between the tip-electrode and the counter-electrode so as to generate an electric field in the ferroelectric sample greater than a coercive field thereof.

Preferably, the apparatus includes scanning-instrumentation which is adapted to induce the tip-electrode and the ferroelectric sample to move relative to each other, so that the tip-electrode scans across the surface of the sample.

Further preferably, the scanning-instrumentation is adapted to induce relative motion between the tip-electrode and the ferroelectric sample at a suitable velocity to produce a stable domain-engineered structure (DES) having a substantially invariant cross-section throughout the ferroelectric sample.

Preferably, the DES includes a one-dimensional DES.

Alternatively, the DES includes a two-dimensional DES.

Preferably, the suitable velocity includes a critical relative velocity having a magnitude $V_{crit}$ approximately equal to $$\frac{R}{\tau_{sw}},$$

wherein R is a size of a stable domain produced by the electric field and $\tau_{sw}$ is a switching time for reversal of a polarization of the ferroelectric sample.

Preferably, a difference between the first and the second potential is set at a value $U_{Rmin}$ approximately equal to or greater than a product of the coercive field and a thickness of the ferroelectric sample.

Further preferably, the difference is pulsed for a pre-determined period $\tau_{dur}$ so as to produce a stable DES having a substantially invariant cross-section throughout the ferroelectric sample.

Preferably, the DES includes a zero-dimensional DES.

Further preferably, the DES includes a one-dimensional DES.

Alternatively, the DES includes a two-dimensional DES.

Preferably, the pre-determined period $\tau_{dur}$ is greater than a switching time $\tau_{sw}$ for reversal of a polarization of the ferroelectric sample and is less than a dielectric relaxation time $\tau_{rel}$ of the ferroelectric sample.

Preferably, the apparatus includes an insulating holder which is adapted to hold the ferroelectric sample and to electrically insulate the counter-electrode.

Preferably, the tip-electrode terminates in two or more separate sharp points, and the electric field includes substantially similar respective electric fields generated by each point.

Preferably, the tip-electrode terminates in a multi-dimensional surface.

Alternatively, the tip-electrode terminates in a single sharp point.

Preferably, the voltage source is adapted to generate a sufficient potential so as to form one or more stable domains in the ferroelectric sample.

Preferably, the one or more stable domains include a zero-dimensional DES having a substantially invariant cross-section throughout the sample.

Further preferably, the one or more stable domains include a one-dimensional DES having a substantially invariant cross-section throughout the sample.

Alternatively, the one or more stable domains include a two-dimensional DES having a substantially invariant cross-section throughout the sample.

Preferably, the ferroelectric sample includes an optical element.

Preferably, the one or more stable domains include a periodic DES.

Alternatively, the one or more stable domains include an a periodic DES.

Preferably, the ferroelectric sample includes an existing DES, and the apparatus is adapted to erase at least a part of the existing DES.

Further preferably, the positioning-instrumentation is adapted to maintain the position of the tip-electrode to be substantially in contact with the surface of the ferroelectric sample.

Preferably, the tip-electrode, the counter-electrode, and the positioning-instrumentation are adapted to be operative as a scanning force microscope which reads the ferroelectric sample.

Preferably, the apparatus includes a thermal conditioning element which is adapted to thermally process the ferroelectric sample after generation of the electric field therein so as to alter a dimension of a domain-engineered structure in the ferroelectric sample and to stabilize the dimension.

There is further provided, according to a preferred embodiment of the present invention, a method for forming a domain-engineered structure (DES) in a ferroelectric sample, including:

maintaining a tip-electrode at a substantially ground potential;

positioning a counter-electrode in proximity to the tip-electrode, so as to form a space therebetween;

applying a non-ground potential to the counter-electrode;

placing the ferroelectric sample in the space; and positioning the tip-electrode relative to a surface of the ferroelectric sample so as to generate an electric field in the ferroelectric sample between the tip-electrode and the counter-electrode that is greater than a coercive field of the sample.

Preferably, the method includes inducing the tip-electrode and the ferroelectric sample to move relative to each other, so that the tip-electrode scans across the surface of the ferroelectric sample.

Preferably, inducing the tip-electrode and the ferroelectric sample to move relative to each other includes inducing the tip-electrode and the ferroelectric sample to move at a suitable relative velocity to produce a stable domain-engineered structure (DES) having a substantially invariant cross-section throughout the ferroelectric sample.

Preferably, the DES includes a one-dimensional DES.

Alternatively, the DES includes a two-dimensional DES.

Preferably, the suitable relative velocity includes a critical relative velocity having a magnitude $V_{crit}$ approximately equal to $$\frac{R}{\tau_{sw}},$$

wherein R is a size of a stable domain produced by the electric field and $\tau_{sw}$ is a switching time for reversal of a polarization of the ferroelectric sample.

Preferably, applying the non-ground potential includes applying a potential at a value $U_{Rmin}$ approximately equal to or greater than a product of the coercive field and a thickness of the ferroelectric sample.

Further preferably, applying the potential includes pulsing the non-ground potential for a pre-determined period $\tau_{dur}$ so as to produce a stable DES having a substantially invariant cross-section throughout the ferroelectric sample.

Preferably, the DES includes a zero-dimensional DES.

Further preferably, the DES includes a one-dimensional DES.

Alternatively, the DES includes a two-dimensional DES.

Preferably, the pre-determined period $\tau_{dur}$ is greater than a switching time $\tau_{sw}$ for reversal of a polarization of the ferroelectric sample and is less than a dielectric relaxation time $\tau_{rel}$ of the ferroelectric sample.

Preferably, the method includes maintaining a temperature of the ferroelectric sample different from an ambient temperature of the apparatus.

Further preferably, the method includes terminating the tip-electrode in two or more separate sharp points, so that the electric field includes substantially similar respective electric fields generated by each point.

Preferably, the method includes terminating the tip-electrode in a multi-dimensional surface.

Alternatively, the method includes terminating the tip-electrode in a single sharp point.

Preferably, the method includes forming one or more stable domains in the ferroelectric sample.

Preferably, the one or more stable domains include a zero-dimensional DES having a substantially invariant cross-section throughout the sample.

Further preferably, the one or more stable domains include a one-dimensional DES having a substantially invariant cross-section throughout the sample.

Alternatively, the one or more stable domains include a two-dimensional DES having a substantially invariant cross-section throughout the sample.

Preferably, the ferroelectric sample includes an optical element.

Preferably, the one or more stable domains include a periodic DES.

Alternatively, the one or more stable domains include an a periodic DES.

Preferably, the ferroelectric sample includes an existing DES, and the method includes erasing at least a part of the existing domain.

Preferably, positioning the tip-electrode includes placing the tip-electrode to be substantially in contact with the surface of the ferroelectric sample.

Preferably, the tip-electrode and the counter-electrode are adapted to be operative as a scanning force microscope which reads the ferroelectric sample.

Preferably, the method includes thermally processing the ferroelectric sample after generation of the electric field therein so as to alter a dimension of a domain-engineered structure in the ferroelectric sample and to stabilize the dimension.

There is further provided, according to a preferred embodiment of the present invention, a method for forming a domain-engineered structure (DES) in a ferroelectric sample, including:

maintaining a tip-electrode at a first potential;

positioning a counter-electrode in proximity to the tip-electrode, so as to form a space therebetween;

placing the ferroelectric sample in the space; and setting the counter-electrode at a second potential, different from the first potential, so that a difference between the first and the second potential is a value greater than approximately 150 V.

There is further provided, according to a preferred embodiment of the present invention, scanning probe apparatus, including:

a tip-electrode which is coupled to be held at a first potential;

a counter-electrode which is positioned in proximity to the tip-electrode;

a voltage source, coupled to maintain the counter-electrode at a second potential so as to generate an electric field between the tip-electrode and the counter-electrode; and positioning-instrumentation, which is adapted to maintain the tip-electrode at a suitable position relative to a surface of a ferroelectric sample located in a space between the tip-electrode and the counter-electrode so that the electric field is greater than a coercive field of the ferroelectric sample and forms one or more stable domains in the ferroelectric sample, each domain having a substantially invariant cross-section throughout the sample.

There is further provided, according to a preferred embodiment of the present invention, a method for forming a domain-engineered structure (DES) in a ferroelectric sample, including:

maintaining a tip-electrode at a first potential;

positioning a counter-electrode in proximity to the tip-electrode so as to form a space therebetween;

placing the ferroelectric sample in the space;

setting the counter-electrode at a second potential differing from the first potential; and inducing relative motion between the tip-electrode and the ferroelectric sample at a suitable velocity to produce a stable domain-engineered structure (DES) having a substantially invariant cross-section throughout the ferroelectric sample.

Preferably the method includes the first and second potential generating an electric field in the ferroelectric sample greater than a coercive field thereof.

Preferably, the suitable velocity includes a critical relative velocity having a magnitude $V_{crit}$ approximately equal to $$\frac{R}{\tau_{sw}},$$

wherein R is a size of a stable domain produced by an electric field generated in the ferroelectric sample by the first and second potential and $\tau_{sw}$ is a switching time for reversal of a polarization of the ferroelectric sample.

There is further provided, according to a preferred embodiment of the present invention, scanning probe apparatus, including:

a tip-electrode;

a counter-electrode which is positioned in proximity to the tip-electrode;

a voltage source, coupled to maintain a potential between the tip-electrode and the counter-electrode;

positioning-instrumentation, which is adapted to maintain the tip-electrode at a suitable position relative to a surface of a ferroelectric sample located in a space between the tip-electrode and the counter-electrode so as to generate a stable domain in the ferroelectric sample; and a thermal conditioning element which thermally processes the stable domain to alter a dimension of the stable domain and to stabilize the dimension.

There is further provided, according to a preferred embodiment of the present invention, a method for forming a domain-engineered structure (DES) in a ferroelectric sample, including:

positioning a counter-electrode in proximity to a tip-electrode, so as to form a space therebetween;

applying a potential between the counter-electrode and the tip-electrode;

placing the ferroelectric sample in the space;

positioning the tip-electrode relative to a surface of the ferroelectric sample so as to generate a stable domain in the ferroelectric sample; and thermally processing the stable domain so as to alter a dimension of the stable domain and stabilize the dimension.

The present invention will be more fully understood from the following detailed description of the preferred embodiment thereof, taken together with the drawings, in which:

DETAILED DESCRIPTION OF PREFERRED EMBODIMENTS

Figure 1:
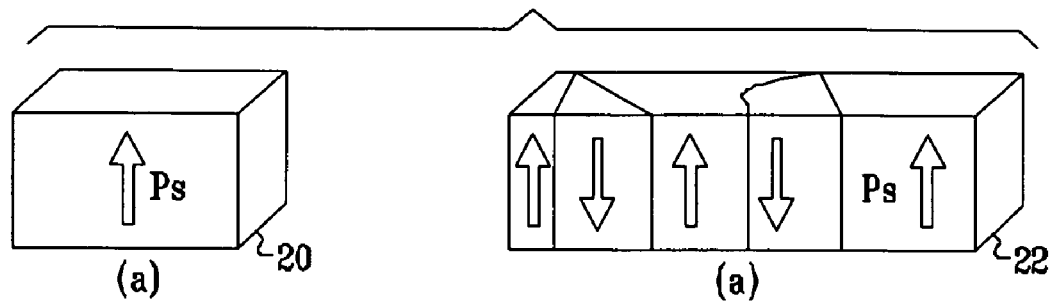
FIG. 1 is a schematic diagram of two types of collinear ferroelectric, as are known in the art.
Figure 2:
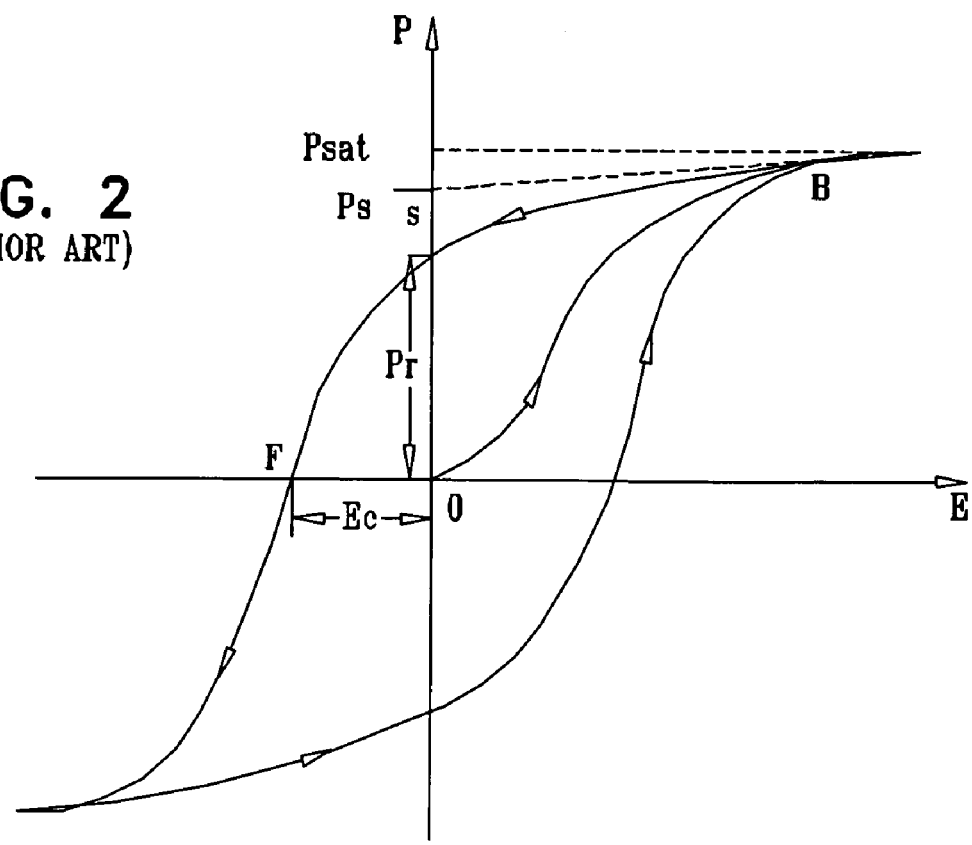
FIG. 2 is a hysteresis curve for a multi-domain ferroelectric, plotting polarization vs. electric field, as is known in the art.
Figure 3:
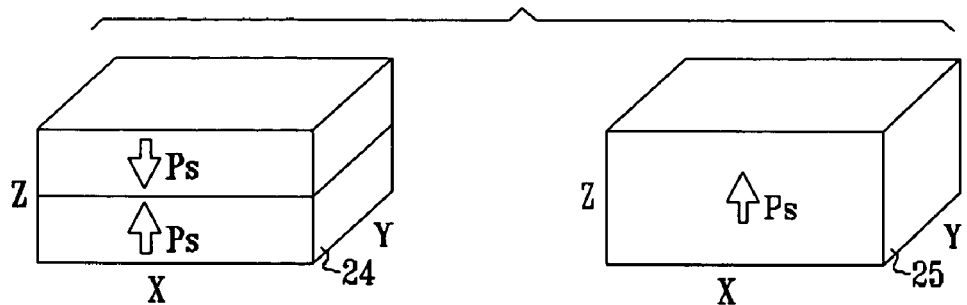
FIG. 3 is a schematic diagram of domain engineered structures and graphs of their properties, as are known in the art.
Figure 3:
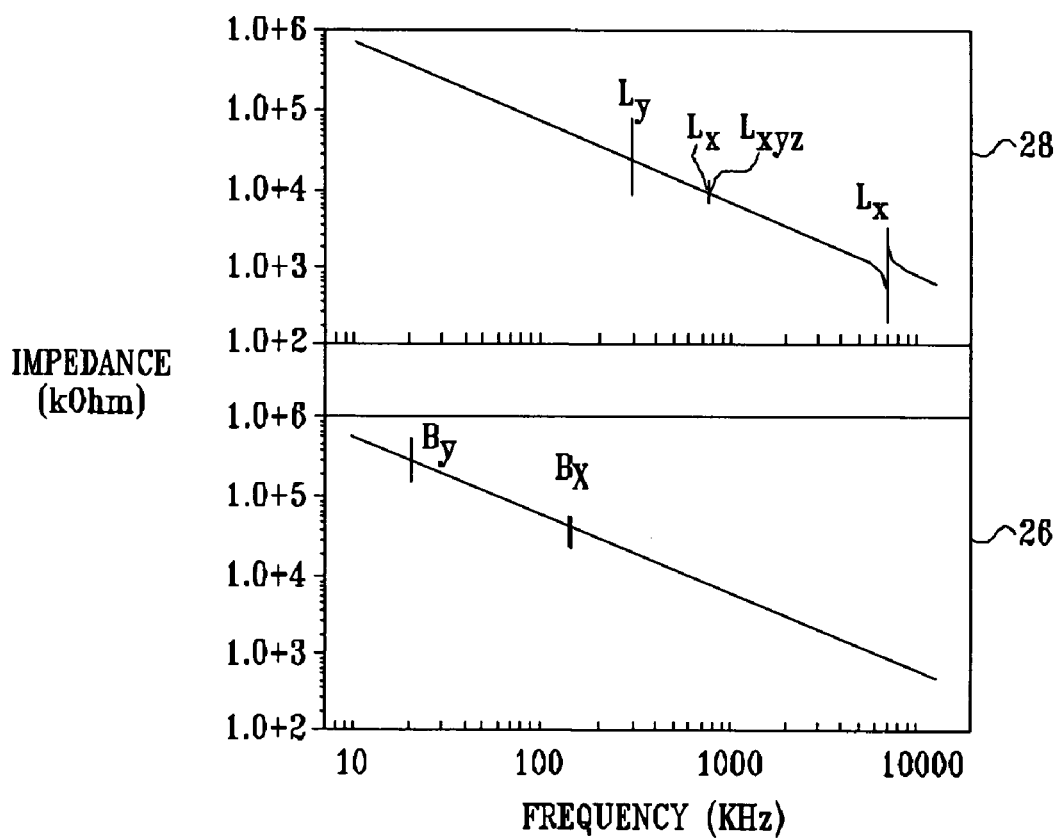
Figure 3:
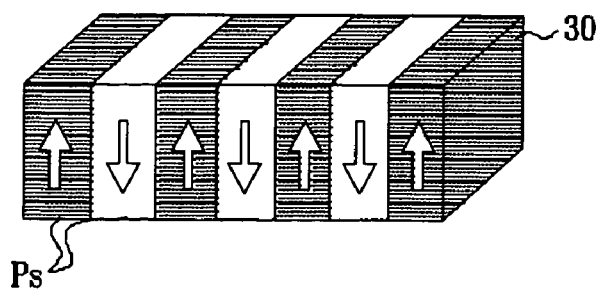
Figure 4:
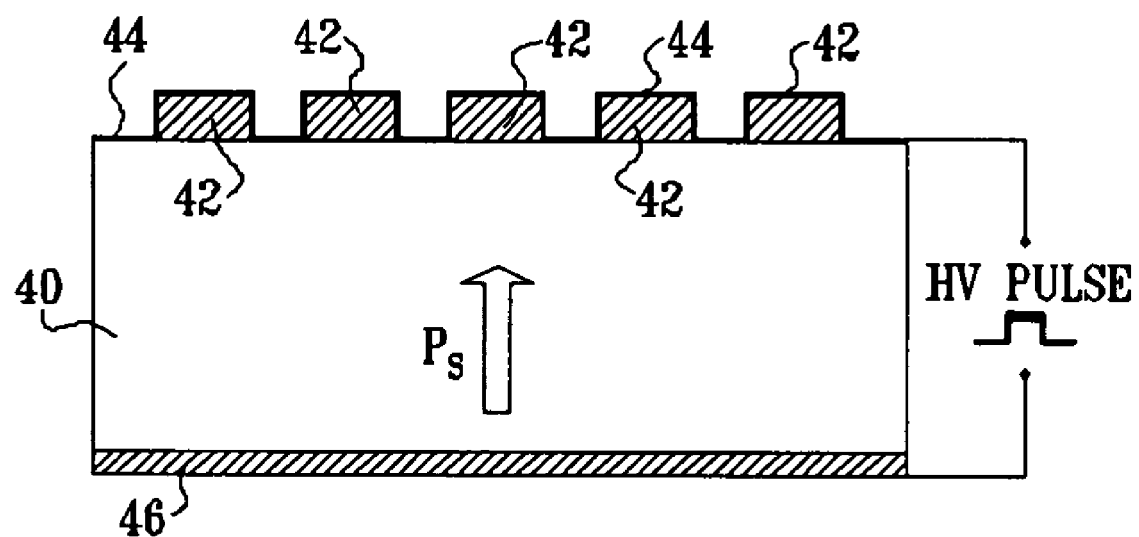
FIG. 4 is a schematic diagram of a poling system for fabrication of DESs, as is known in the art.
Figure 5:
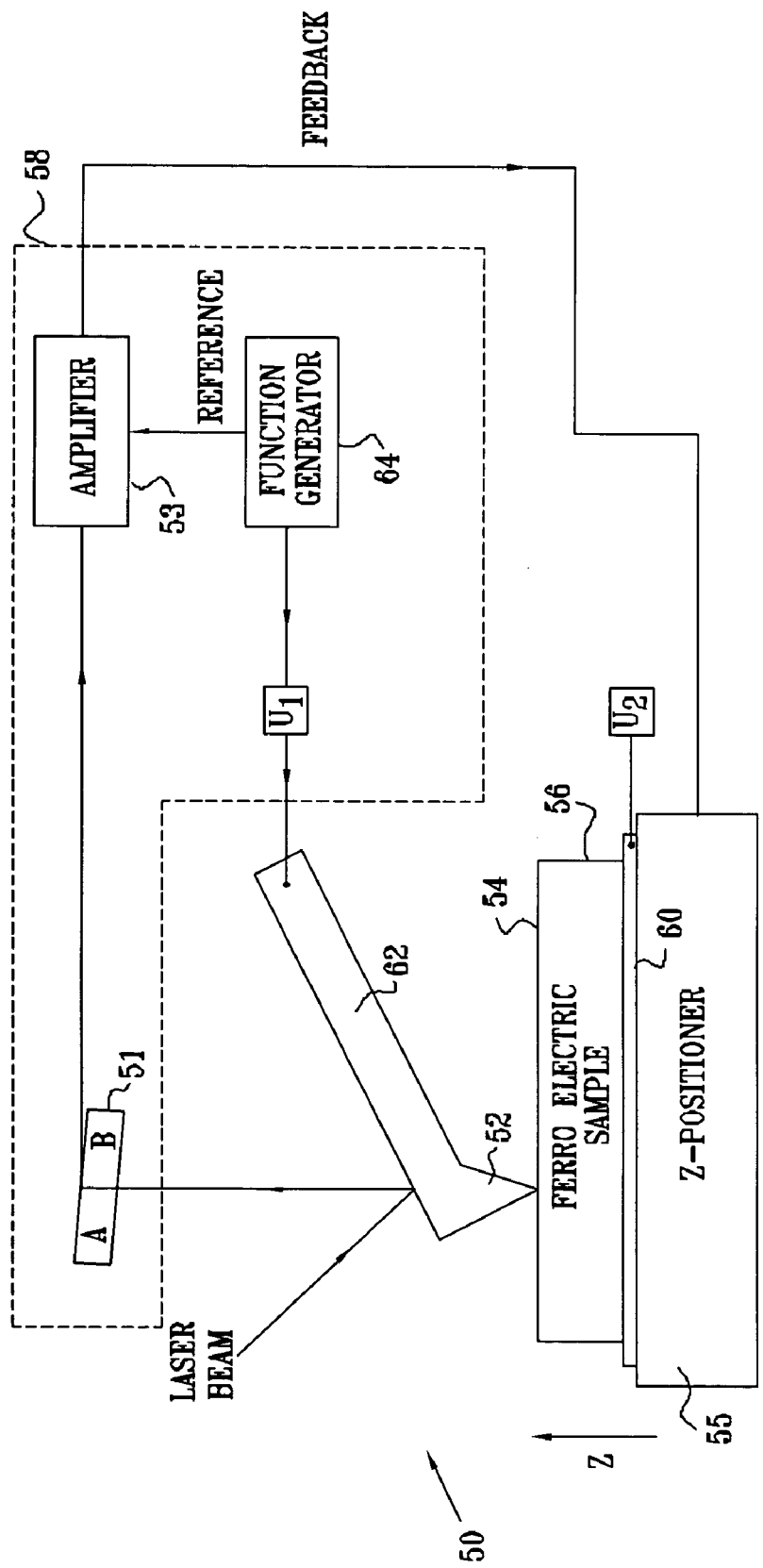
FIG. 5 is a schematic diagram of a scanning force microscope, as is known in the art.
Figure 6:
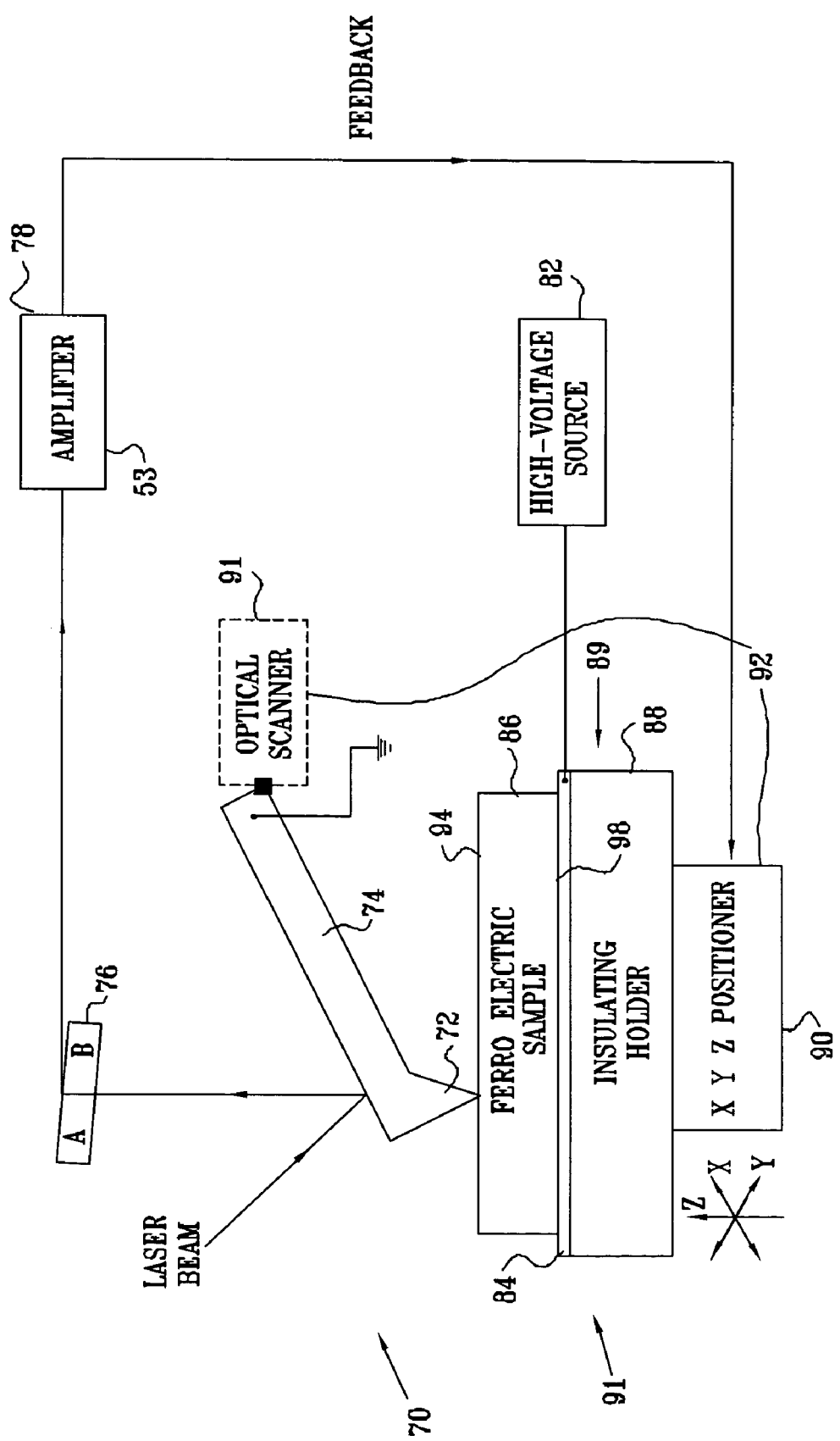
FIG. 6 is a schematic diagram of a scanning probe apparatus (SPA), according to a preferred embodiment of the present invention.

Reference is now made to FIG. 6, which is a schematic diagram of a scanning probe apparatus (SPA) 70, according to a preferred embodiment of the present invention. SPA 70 is most preferably implemented from a scanning force microscope, by methods which will be apparent to those skilled in the art. In some preferred embodiments of the present invention, SPA 70 is implemented so as to be convertible to a scanning force microscope, so that the one apparatus may be used to form domain-engineered structures (DESs) or as a microscope which is able to read the DESs formed. SPA 70 is used to generate DESs in a ferroelectric sample 86. SPA 70 comprises a tip-electrode 72 connected to a conducting cantilever 74. Tip-electrode 72 ends in an extremely sharp point, the point being sharp enough to generate extremely high electric fields in its region, and thus initiate the process of domain formation, as is known in the art. Cantilever 74 is grounded, i.e., the potential of the cantilever is set to zero. The grounding of the cantilever and consequently of tip-electrode 72 serves to prevent damage from high voltages, utilized as explained below, to the cantilever and to any instrumentation physically connected to the cantilever.

Tip-electrode 72 is preferably held substantially in contact with upper surface 94 of sample 86, by one or more methods known in the art. Alternatively, tip-electrode 72 is held at a substantially constant distance, typically less than one nanometer, from upper surface 94. Most preferably, a laser beam is reflected from an upper surface of cantilever 74 onto a 2-quadrant photo-detector 76. A signal from the photo-detector is used as an input signal to an amplifier 78, which in turn provides a feedback signal to a piezoelectric positioner 90. Piezoelectric positioner 90 supports an electrically insulated sample holder 88, which holds ferroelectric sample 86. The feedback signal acts as an input to positioner 90, which in response to the signal moves holder 88 and sample 86 in a vertical z-direction. In addition to z-direction motion, positioner 90 is most preferably implemented for both horizontal x-direction and y-direction motion. Positioner 90 is thus able to position sample 86 at substantially any desired horizontal position relative to tip-electrode 72. Preferably, positioner 90 also operates to move sample 86 in substantially any horizontal direction, so that tip-electrode 72 is able to be scanned at a substantially fixed predetermined velocity across and relative to surface 94. Alternatively or additionally, one or more piezoelectric scanners 91 are attached to cantilever 74, to scan the cantilever horizontally. Thus, positioner 90 and/or scanners 91 act as scanning instrumentation 92 for scanning tip-electrode 72 relative to sample 86.

Ferroelectric sample 86 is most preferably in the form of a wafer, having an overall thickness up to approximately 10 mm, although some preferred embodiments of the present invention may be operative with greater thicknesses than 10 mm. Preferably, sample 86 is positioned on a solid or liquid counter-electrode 84, which in turn is mounted on holder 88. Alternatively or additionally, counter-electrode 84 comprises a conductive coating applied to a lower surface 98 of sample 86. Counter-electrode 84 is connected to a high voltage DC source 82. Source 82 may be set at substantially any fixed voltage, most preferably in an approximate range of +15 kV to −15 kV. In some preferred embodiments of the present invention, the voltage range of source 82 may be larger. Source 82 is adapted to provide steady or pulsed DC voltages to counter-electrode 84. Thus, a potential difference between counter-electrode 84 and tip-electrode 72 may be set to be approximately 150 V or more, in contrast to SPA systems known in the art wherein the potential difference between the electrodes is significantly less than 150 V. Thus, as described in more detail below, stable DESs may be formed in bulk ferroelectric materials using SPA 70.

In order to generate a specific DES in sample 86, the sample is first pre-positioned by positioner 90. A high voltage is applied by source 82 to electrode 84. The voltage is set to be high enough to overcome a coercive field of the sample, so that a minimum voltage $U_{Rmin}$ set depends on the composition of the sample and on the thickness of the sample. For example, for a sample comprising 350 micron thick RbTiOPO$_4$ (RTP), which has a coercive field of 30 kV/cm, the voltage is set to a minimum of 1.05 kV. It will be understood that values for the voltage $U_{Rmin}$ applied to counter-electrode 84, in order to form a DES in sample 86, are given by $$U_{Rmin} \geq E_c \cdot d \tag{3}$$

wherein $E_c$ is the coercive field of sample 86, and d is a thickness of the sample.

In some preferred embodiments of the present invention, in order to form the DES, instrumentation 92 moves sample 86 at a substantially fixed velocity V, while voltage $U_{Rmin}$ is applied to electrode 84. As described in the Background of the Invention, for a sample which is spontaneously polarized, domains are formed by a three stage process comprising primary domain nucleation, domain forward growth, and secondary domain nucleation at the walls of the primary domain. Preferably, tip-electrode 72 terminates at one extremely sharp point having a size of about 10–100 nm, which is close to a stable domain size. Application of a voltage of the order of a kilovolt between counter-electrode 84 and tip-electrode 72 accordingly generates, in the region of the tip, electric fields of the order of 10$^7$ V/cm. Fields of this size are two or more orders of magnitude greater than electric fields described in *Principles and Applications of Ferroelectric and Related Materials*, by Lines et al., referred to in the Background of the Invention.

Such large fields lead to virtually zero activation energy for new domain nucleus formation. Thus, the terms $\tau_{nucl}$ and $\tau_{forw}$ in equation (1) of the Background of the Invention are significantly changed compared with values for conventionally applied repolarization fields, both being extremely small compared with $\tau_{stab}$.

Therefore, a switching time $\tau_{sw}$ may be defined by a time $\tau_{stab}$ needed for generation of a stable domain, and equation (1) reduces to $$\tau_{sw} \approx \tau_{stab} \tag{4}$$

Figure 7:
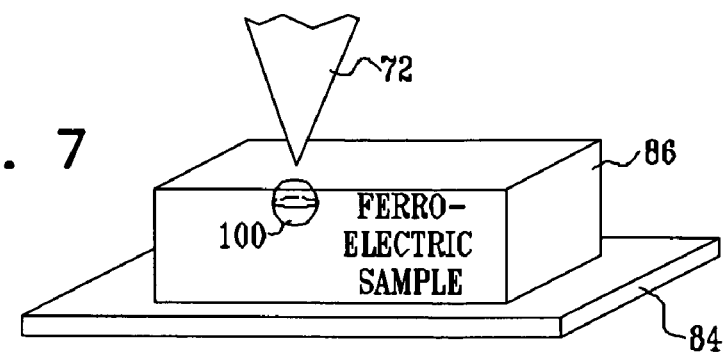
FIG. 7 is a schematic diagram showing formation of a primary domain in a ferroelectric material, according to a preferred embodiment of the present invention.

FIG. 7 is a schematic diagram showing formation of a primary domain 100, according to a preferred embodiment of the present invention. Primary domain 100 is assumed to be a spherical domain, having a stable domain size R, which is formed as tip-electrode 72 passes over sample 86. The stable domain size of a sample may be measured experimentally by methods which are known in the art. A critical velocity $V_{crit}$ of tip-electrode 72, relative to sample 86, may be defined as $$V_{crit} \approx \frac{R}{\tau_{stab}} \qquad (5)$$

Equation (5), and equations derived from it, apply when counter-electrode 84 is maintained at a substantially constant high voltage difference with respect to tip-electrode 72.

Substituting equation (4) in equation (5) gives $$V_{crit} \approx \frac{R}{\tau_{sw}} \qquad (6)$$

A relative velocity V of tip-electrode 72 can be in one of three regions defined by the equations below $$V > V_{crit} \qquad (7a)$$

$$V < V_{crit} \qquad (7b)$$

$$V \approx V_{crit} \qquad (7c)$$

At relative velocities defined by equation (7a), wherein tip-electrode 72 moves faster than the critical velocity, $V_{crit}$, relative to sample 86, the speed of movement causes primary nucleus 100 to be unstable. The instability results in nucleus 100 either not forming at all, or at least some nuclei such as nucleus 100 forming then collapsing. Thus at relative velocities defined by equation (7a) any domains generated tend to be unstable and/or partly formed and/or to exhibit narrowing effects. Furthermore domains formed at these velocities tend not to penetrate through sample 86, i.e., they are predominantly surface domains.

At relative velocities defined by equation (7b), wherein tip-electrode 72 moves slower than the critical velocity, $V_{crit}$, relative to sample 86, the speed of movement is slow enough to allow more than one primary nucleus 100 to form. Multiple primary nuclei lead to many secondary nuclei forming, which in turn leads to domains which are formed being stable, but exhibiting undesirable domain broadening effects, including widening of the domains at surface 94 and further widening through the bulk of sample 86.

At relative velocities defined by equation (7c), wherein tip-electrode 72 moves approximately at the critical velocity, $V_{crit}$, relative to sample 86, the speed of movement enables one primary nucleus 100 to form. As a result, at these velocities the process of domain formation leads to formation of well-defined domains throughout the bulk of the sample. The domains formed by tip-electrode 72 being scanned at velocities approximately equal to the critical velocity, $V_{crit}$, do not exhibit domain broadening or narrowing effects throughout the bulk of the sample, i.e., a cross-section of each domain is substantially invariant as measured through the sample.

Figure 8:
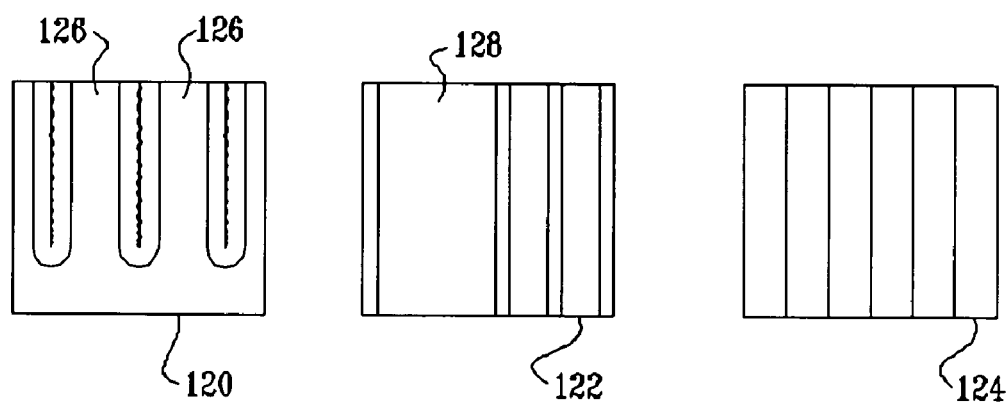
FIG. 8 is a set of schematic diagrams showing results obtained by scanning at the ferroelectric sample referred to in FIG. 7 at different velocities, according to a preferred embodiment of the present invention.

FIG. 8 is a set of schematic diagrams showing results obtained by scanning at velocities defined by equations (7a), (7b), and (7c), according to a preferred embodiment of the present invention. The diagrams show schematic outlines of domain walls, as seen looking at samples of RTP along the z direction. The inventors measured the results on spontaneously polarized samples of RTP having a thickness of approximately 340 microns, the samples being scanned to form periodic DESs. A voltage of approximately 1 kV was applied to counter-electrode 84. Measurements on the sample using an atomic force microscope operating in a topography mode gave a domain size R approximately equal to 0.23 microns, and a switching time $\tau_{sw}$ was evaluated, as described in the Background of the Invention, as equal to 2.5 ms. Thus, from equation (6)

$$V_{crit} \approx \frac{0.23}{2.5} = 92 \; \mu m/s \qquad (8)$$

Dark lines in the diagrams indicate walls between oppositely polarized domains. Diagram 120 shows structures formed when the sample and the tip-electrode moved with a relative velocity of 130 microns/s, corresponding to equation (7a). As seen in diagram 120, there are regions 126 where substantially no domains form. Diagram 122 shows structures formed for a tip-sample velocity of 10 micron/s, corresponding to equation (7b), and region 128 shows strong domain broadening.

Diagram 124 shows structures formed for a tip-sample velocity of 80 micron/s, corresponding to equation (7c). The DES shows periodically formed domains, demonstrating that relative velocities defined by equations (6) and (7c) generate DESs of good quality.

Figure 9:
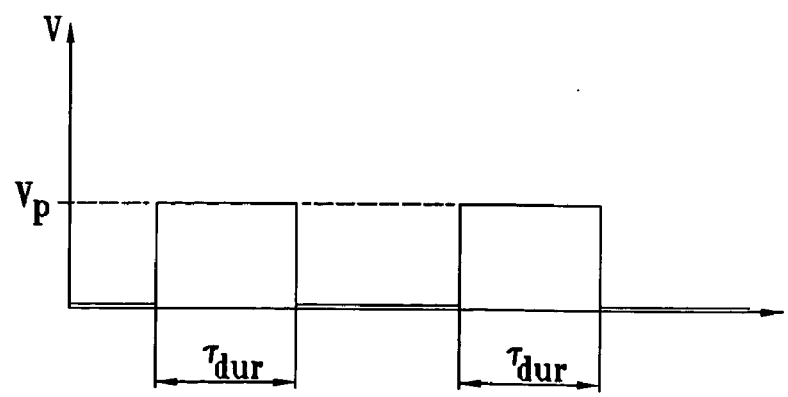
FIG. 9 is a graph of a pulsed DC voltage applied to a counter-electrode of the SPA of FIG. 6, according to an alternative preferred embodiment of the present invention.

FIG. 9 is a graph of a pulsed DC voltage applied to counter-electrode 84, according to an alternative preferred embodiment of the present invention. In contrast to the above description for generation of DESs with SFM 70 wherein substantially steady DC voltages are applied to counter-electrode 84, in the alternative preferred embodiment a pulsed DC voltage $V_p$ is applied to counter-electrode 84, as sample 86 is scanned relative to tip-electrode 72. The pulsed DC voltage has an "on" time of $\tau_{dur}$.

As stated in the Background of the Invention, equation (2), $$\tau_{dur} > \tau_{sw} \qquad (2)$$

needs to hold for any DES formed by pulsed DC to be stable. During formation of a new domain a depolarizing field is screened by external and/or internal charge flow. External screening is caused by external charge flow occurring via tip-electrode 72 and counter-electrode 84. Internal screening of the depolarizing field may be caused by internal charge motion, within sample 86, of mobile ions, electrons, and/or holes present in the sample. Thus, internal screening is significant for ferroelectric samples having an intermediate to high conductivity. A characteristic dielectric relaxation time $\tau_{rel}$ for internal screening is defined as follows $$\tau_{rel} = \frac{\varepsilon \cdot \varepsilon_0}{\sigma} \qquad (9)$$

wherein $\varepsilon$ and $\sigma$ are respectively a dielectric permittivity and a conductivity of sample 86, and $\varepsilon_0$ is the permittivity of free space.

A domain-broadening effect occurs in ferroelectrics to which pulsed fields are applied, due to nucleation in the bulk of the ferroelectric, similar to the nucleation described with reference to equation (7b) above. The domain-broadening effect occurs when $\tau_{dur}$ is greater than $\tau_{rel}$, i.e., when $$\tau_{dur} > \tau_{rel} \qquad (10)$$

The converse $$\tau_{dur} < \tau_{rel} \qquad (11)$$

holds for domain-broadening not to occur.

It will be appreciated that in practice the domain-broadening effect described herein applies to conductive ferroelectrics, with relatively high σ, since for ferroelectrics with low values of σ, $\tau_{rel}$ is larger than any practical pulse length applied.

Combining inequalities (2) and (11) leads to a condition that is preferably satisfied for generation of DESs using pulses:

$$\tau_{sw} < \tau_{dur} < \tau_{rel} \qquad (12)$$

Pulses having an "on" time $\tau_{dur}$ which satisfies condition (12) avoid instabilities associated with inequality (2) and domain-broadening effects associated with inequality (10).

The RTP samples described above with reference to FIG. 8 had a relaxation time $\tau_{rel}$ (calculated from the conductivity and dielectric permittivity of the sample) of approximately 2 s. Thus, pulse durations lying in the range $$2.5 \text{ ms} < \tau_{dur} < 2\text{s} \qquad (13)$$

provide stable, well-defined, DESs in RTP.

Figure 10:
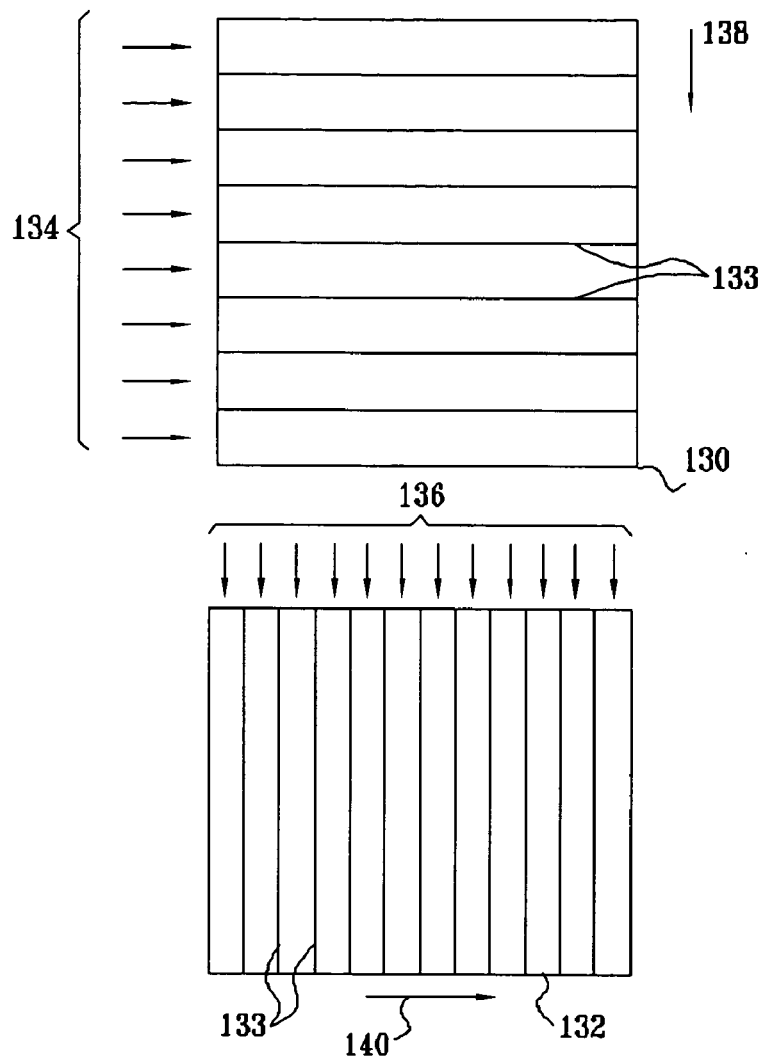
FIG. 10 is a schematic diagram showing results of producing a one-dimensional domain engineered structure (DES), according to a preferred embodiment of the present invention.

FIG. 10 is a schematic diagram showing results of producing one-dimensional DESs, according to a preferred embodiment of the present invention. Diagram 130 and diagram 132 illustrate domain walls 133 produced in two samples of RTP having thicknesses substantially equal to 350 microns, as seen by optically imaging a top surface of the samples. For both samples, counter-electrode 82 was set to be substantially constant at approximately +0.85 kV or −0.85 kV. The samples were produced by scanning at one of these voltages, repositioning the sample, toggling to the second voltage, then scanning at the toggled voltage.

In the first sample, the DES illustrated by diagram 130 was produced by scanning tip-electrode 72 at approximately 36 microns/s, in directions 134. After each scan, performed substantially as described above with reference to FIG. 7, the first sample was repositioned in a direction 138 by positioner 90, and a further scan in direction 134 was performed. A period of the resultant one-dimensional DES was evaluated at 8.45 microns.

In the second sample, the DES illustrated by diagram 132 was produced by scanning tip-electrode 72 at approximately 40 microns/s, in directions 136. After each scan the second sample was repositioned in a direction 140, and a further scan in direction 136 was performed. For the second sample, a period of the resultant one-dimensional DES was evaluated at 2.2 microns. Using similar procedures to those described hereinabove for the first and second samples, the inventors have produced one-dimensional DESs having periods as small as 1.1 microns. It will be appreciated that periods of this magnitude have not been fabricated by prior art systems operating on bulk ferroelectrics.

The inventors checked both samples after fabrication, and substantially similar results to those shown in diagrams 130 and 132 were seen when the opposite faces of the respective samples were optically imaged, showing that the ferroelectric domains produced were well-defined and substantially rectilinear. Furthermore, optical imaging of both samples after periods greater than 30 days showed substantially no change in the images, demonstrating that the samples produced are stable.

Figure 11:
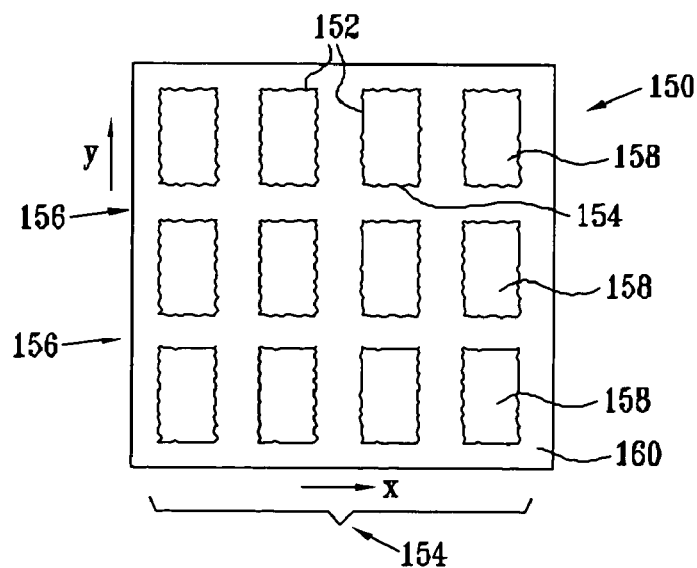
FIG. 11 is a schematic illustration of a two-dimensional DES, according to a preferred embodiment of the present invention.

FIG. 11 is a schematic illustration of a two-dimensional DES 150, according to a preferred embodiment of the present invention. DES 150 comprises a sample of RTP, and has domain walls which are represented in the figure as dark lines 152. Initially a periodic one-dimensional DES in the x-direction was implemented, substantially as described above with reference to FIG. 10, by counter-electrode 84 being set substantially equal to +1 kV, and tip-electrode 72 being scanned in a y-direction along lines 154. Counter-electrode 84 was then set to approximately −1 kV, and the sample was then scanned along x-direction lines 156. The resultant DES 150 consists of rectangular domains 158 having one direction of polarization, set in a matrix 160 having a polarization in the opposite direction.

Figure 12:
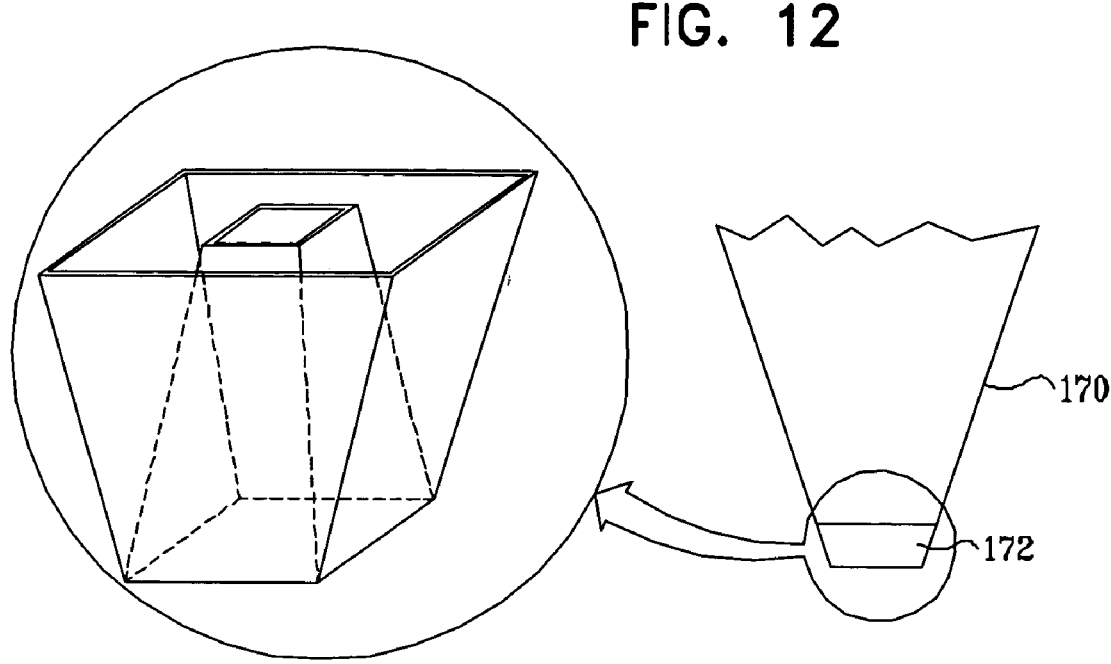
FIG. 12 is a schematic illustration of a multi-dimensional tip-electrode, according to a preferred embodiment of the present invention.

FIG. 12 is a schematic illustration of a multi-dimensional tip-electrode 170, according to a preferred embodiment of the present invention. Multi-dimensional tip-electrode 170, herein termed MDTE 170, is used in place of tip-electrode 72. In contrast to methods of producing DESs as described above, where tip-electrode 72 is scanned across upper surface 94 of sample 86, MDTE 170 forms a DES by being held over upper surface 94 in a substantially stationary position. Unlike tip-electrode 72, which terminates in a sharp point, MDTE 170 terminates in a generally flattened face 172, the face having a shape corresponding to the DES to be formed in sample 86. Most preferably, multi-dimensional tip-electrodes similar to MDTE 170 are implemented by using focussed ion beam shaping techniques. By way of example, face 172 is assumed to be square in shape, having sides of the order of 1 micron, thus forming square domains, but it will be appreciated that multi-dimensional tip-electrodes can be terminated in substantially any shape, so that substantially any shape domain can be generated.

In order to form a domain using MDTE 170, the MDTE is positioned over upper surface 94 of sample 86, substantially as described above for tip-electrode 72 with reference to FIG. 6. Also, as described therein, cantilever 74, and consequently MDTE 170, are grounded. A high-voltage pulse is applied to counter-electrode 84, the pulse being of a sufficiently high voltage to generate a field, greater than a coercive field of the sample, within the sample. A duration of the pulse is preferably set to agree with condition (12). MDTE 170 thus acts to "brand" sample 86 with a DES in the form of a square. It will be understood that a DES similar to that shown in FIG. 11 can be produced by a process of scanning MDTE 170 rectilinearly, stopping the scanning, and branding at positions corresponding to domains 158.

Figure 13:
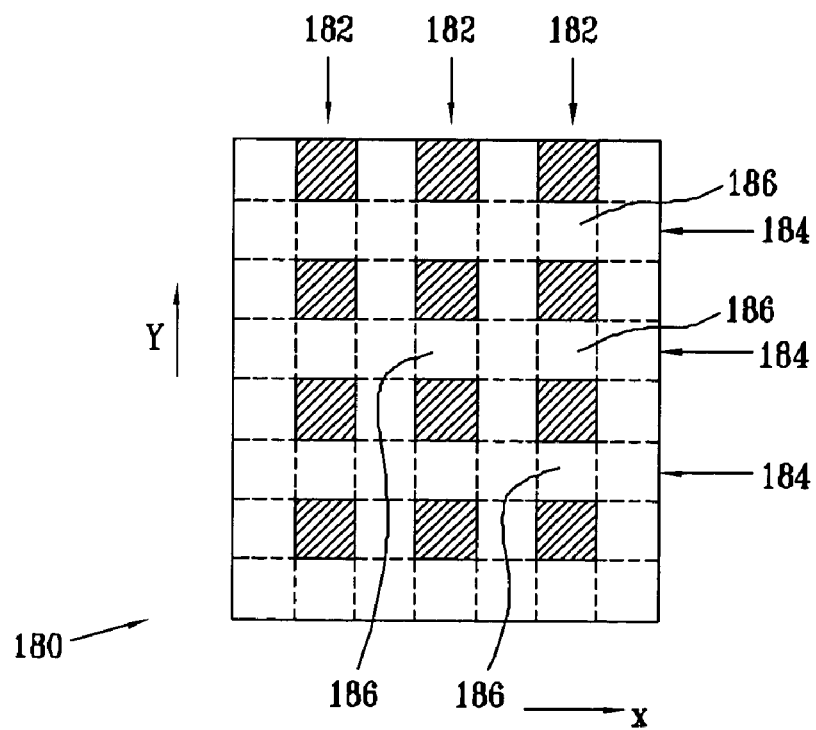
FIG. 13 is a schematic diagram showing formation and erasure of DESs, according to a preferred embodiment of the present invention.

FIG. 13 is a schematic diagram showing formation and erasure of DESs, according to a preferred embodiment of the present invention. An RTP sample 180 was initially polarized in a mono-domain state. The inventors then formed linear DESs 182 in RTP sample 180, along lines parallel to a y-axis of the sample. The DESs were formed by linearly scanning sample 180, as described above with reference to FIG. 8, in SPA 70, using sample 180 in place of sample 86. DESs 182 were formed with counter-electrode 84 set at approximately +1 kV, and were formed by reversal of the initial polarization.

After formation of DESs 182, counter-electrode 84 was reset to approximately −1 kV. Sample 180 was then scanned along lines 184 parallel to an x-direction of sample 180. Regions 186 are regions which were originally poled as DES 182, and then their polarization was restored to the initial direction, demonstrating both erasure and correction in DESs 182.

Referring back to FIG. 6, in some preferred embodiments of the present invention, scanner sample holder 88 comprises a heater 89. Heater 89 most preferably comprises a feedback source, so that it is able to maintain sample 86 at a substantially constant temperature above an ambient room temperature. Maintaining sample 86 at an elevated temperature reduces the coercive field of the sample, compared to the coercive field at room temperature, as is known in the art.

For example, the inventors have found that a LiTaO$_3$ crystal having a coercive field of 150 kV/cm at room temperature had a reduced coercive field of 37 kV/cm at a temperature of the order of 58° C. Operating SPA 70 with a LiTaO$_3$ crystal 300 microns thick in place of sample 86, and maintaining the crystal above 58° C., the inventors were able to form linear domains in the crystal by scanning tip-electrode 72, with counter-electrode 84 set at approximately 1.2 kV. It will be appreciated that domain production may be possible in 300 micron LiTaO$_3$ at room temperature, but from equation (3) a minimum applied potential for production is 4,500 V.

In some preferred embodiments of the present invention, scanner sample holder 88 comprises a cooler 91 in place of heater 89. Cooler 91 most preferably comprises a container in which a coolant such as liquid nitrogen may be placed. As described above with reference to equations (10) and (11), domain broadening occurs in ferroelectric samples having high values of conductivity σ. By using cooler 91 to cool sample 86 to temperatures of the order of 170 K, SPA 70 may be operated to produce stable, well-defined DESs in ferroelectric materials which have high conductivity at room temperature. For example, KTP crystals have σ≈$10^{-6}Ω^{-1}$ cm$^{-1}$ at room temperature, so that strong domain broadening occurs when SPA 70 generates DESs in a KTP sample at room temperature. However, reducing the temperature of the KTP sample to 170 K reduces the conductivity to approximately $10^{-12}Ω^{-1}$ cm$^{-1}$. Thus, operating SPA 70 on samples of KTP at 170 K generates stable, well-defined DESs.

Preferred embodiments of the present invention are implemented so that a high potential difference of up to approximately 15 kV can be applied between tip-electrode 72 and counter-electrode 84. Preferably, as described hereinabove, tip-electrode 72 is grounded, and the high (or low) potential is applied to counter-electrode 84. It will be appreciated that other arrangements for the electrodes may be implemented. For example, both electrodes may be maintained at potentials different from ground, by insulating each electrode from the ground. In such a case, different potentials are applied to each electrode in order to form the required high potential difference between the two electrodes. Alternatively, counter-electrode 84 may be grounded, and the high (or low) potential is applied to tip-electrode 72. In preferred embodiments where tip-electrode 72 is not grounded, any instrumentation attached to cantilever 74, such as scanners 91 if implemented, is insulated from the ground so that voltages applied to the tip-electrode do not adversely affect the instrumentation. It will be appreciated that the scope of the present invention includes all such arrangements enabling a high potential difference to be maintained between the tip-electrode and the counter-electrode.

It will further be appreciated that tip-electrode 72 may be implemented as a plurality of separated sharp points coupled together electrically. Each of the separate points is able to generate substantially similar but separate electric fields in sample 86, and the plurality of separate points improves the overall field distribution generated by each of the points. By implementing tip-electrode 72 as a multiple point electrode, SPA 70 is thus able to produce DESs in parallel.

Figure 14:
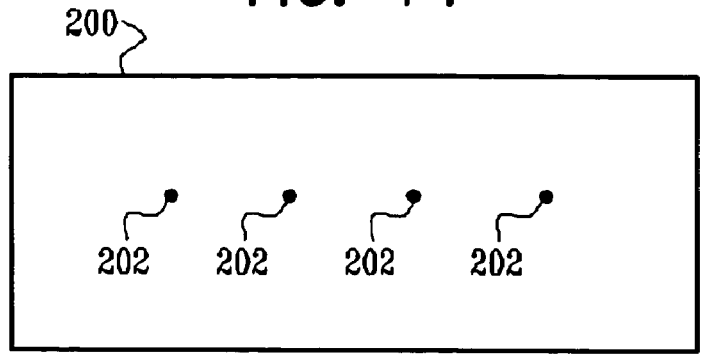
FIG. 14 is a schematic illustration of a zero-dimensional DES, according to a preferred embodiment of the present invention.

FIG. 14 is a schematic illustration of a zero-dimensional DES 200, according to a preferred embodiment of the present invention. DES 200 comprises a sample of any ferroelectric material, and has zero-dimensional domains 202. DES 200 is preferably produced generally as described for the production of one-dimensional DESs (FIG. 10), except that the voltage of counter-electrode 82 is applied only where zero-dimensional domains 202 are to be formed. The zero-dimensional domains are rod-like domains, having generally constant diameters along the rod of the order of 1 µm or less.

Figure 15:
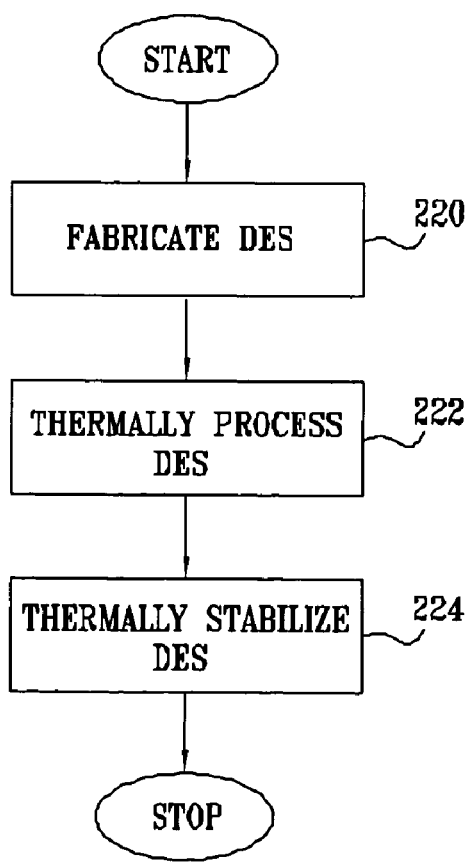
FIG. 15 is a flowchart showing steps involved in adjusting dimensions of stable domains in a DES, according to a preferred embodiment of the present invention.

FIG. 15 is a flowchart showing steps involved in altering dimensions of stable domains in a DES, according to a preferred embodiment of the present invention. In a first step 220, a zero-dimensional, one-dimensional, or two-dimensional DES, is fabricated according to one of the methods described above. Preferably the DES has dimensions of the order of 100 nm and the fabrication is made at room temperature, although other dimensions and temperatures of fabrication may be used. In a heating step 222, the DES is heated to sufficiently change a defect density so that the domain walls become "unpinned." (As described in the article by Gopalan et al. referred to in the Background of the Invention, the domain stabilization process may be related to pinning of the domain wall by randomly distributed defects.) A typical initial defect density for LiNbO$_3$ is of the order of $10^{13}$/cm$^3$. The unpinning of the domain walls causes the domains to shrink in size. In a final step 224, the temperature of the DES is preferably stabilized, or alternatively the DES is cooled, in order to "re-pin" and stabilize the domain walls at the reduced size, which may be different from the original dimensions by approximately an order of magnitude. The heating and/or cooling for the process described hereinabove may be provided by any thermal conditioning element known in the art which operates by conduction, convection, and/or radiation, such as heater 89 and/or cooler 91 (FIG. 6), and it will be appreciated that applying the process allows for tailoring of a DES with dimensions significantly smaller, and with higher resolution, than the dimensions produced at initial fabrication of the DES.

In addition to being able to implement periodic DESs, as described above, it will be appreciated that preferred embodiments of the present invention may be used to construct a periodic DESs, as well as DESs of substantially any regular or irregular form, or combination of such forms. It will be appreciated that DESs as described herein may be implemented as substantially any type of optical element, such as, but not limited to, a backward second harmonic generator, a backward optical parametric oscillator, a second harmonic generator in a region such as the ultra-violet, and a waveguide. For example, a ferroelectric crystal may be utilized as an optical waveguide, and within such a ferroelectric waveguide a DES may be implemented to form a monolithic optical waveguide device such as a periodic or an a periodic grating. It will also be appreciated that the scope of the present invention includes implementing substantially any type of ferroelectric material as a DES.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Scanning probe apparatus, comprising:
   a) a tip-electrode which is coupled to be maintained at a first potential;
   b) a counter-electrode which is positioned in proximity with the tip electrode and which is coupled to be maintained at a second potential differing from the first potential by a value greater than approximately 150 volts; and c) positioning instrumentation, which is adapted to maintain the tip-electrode at a distance from a surface while scanning the tip-electrode parallel to the surface, and controls the position of the tip-electrode in a scanning direction parallel to the surface to within a resolution sufficient so that the apparatus can be used as a scanning probe microscope.

2. Scanning probe apparatus, comprising:

a) a tip-electrode which is coupled to be maintained at a first potential;

b) a counter-electrode which is positioned in proximity with the tip electrode and which is coupled to be maintained at a second potential differing from the first potential by a value greater than approximately 150 volts; and c) positioning instrumentation, which is adapted to maintain the tip-electrode at a distance from a surface while scanning the tip-electrode parallel to the surface, and controls the position of the tip-electrode in a scanning direction parallel to the surface to within better than 1.1 microns.

3. Apparatus according to claim 1 or claim 2, wherein the second potential differs from the first potential by a value of at least 850 volts.

4. Apparatus according to claim 3, wherein the second potential differs from the first potential by a value of at least 1050 volts.

5. Apparatus according to claim 4, wherein the second potential differs from the first potential by a value of at least 1200 volts.

6. Apparatus according to claim 5, wherein the second potential differs from the first potential by a value of at least 4500 volts.

7. Apparatus according to claim 6, wherein the second potential differs from the first potential by a value of at least 15,000 volts.

8. Apparatus according to any of claims 1 or 2, wherein the tip electrode has point dimensions less than 1 micron across.

9. Apparatus according to claim 8, wherein the point dimensions are less than 100 nm.

10. Apparatus according to any of claims 1 or 2, wherein the distance of the tip-electrode from the surface is less than about 1 nm.

* * * * *